US010458795B1

(12) United States Patent
Grine et al.

(10) Patent No.: US 10,458,795 B1
(45) Date of Patent: Oct. 29, 2019

(54) OPTOMECHANICAL GYROSCOPE UTILIZING THE SAGNAC EFFECT

(71) Applicant: National Technology & Engineering Solutions of Sandia, LLC, Albuquerque, NM (US)

(72) Inventors: Alejandro J. Grine, Albuquerque, NM (US); Darwin K. Serkland, Albuquerque, NM (US); Michael Wood, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/100,925

(22) Filed: Aug. 10, 2018

Related U.S. Application Data

(60) Provisional application No. 62/545,172, filed on Aug. 14, 2017.

(51) Int. Cl.
*G01C 19/72* (2006.01)
*G01C 19/66* (2006.01)

(52) U.S. Cl.
CPC ......... *G01C 19/721* (2013.01); *G01C 19/662* (2013.01)

(58) Field of Classification Search
CPC ...... G01C 19/64; G01C 19/72; G01C 19/721; G01C 19/722; G01C 19/662
USPC ...................................................... 356/460
See application file for complete search history.

(56) References Cited

U.S. PATENT DOCUMENTS

| 5,331,404 | A | * | 7/1994 | Moeller | G01C 19/721 356/460 |
|---|---|---|---|---|---|
| 6,370,289 | B1 | * | 4/2002 | Bennett | G01C 19/721 385/12 |
| 2005/0035278 | A1 | * | 2/2005 | Margalit | G01N 21/45 250/227.14 |
| 2009/0244544 | A1 | * | 10/2009 | Terrel | G01C 19/721 356/461 |
| 2013/0088720 | A1 | * | 4/2013 | Sorrentino | G01C 19/64 356/460 |

(Continued)

OTHER PUBLICATIONS

Grutter, K.E. et al., "A Platform for On-Chip Silica Optomechanical Oscillators with Integrated Waveguides", Conference on Lasers and Electro-Optics 2012 OSA Technical Digest (online) (Optical Society of America, 2012), paper CW1M.5 (//doi.org/10.1364/CLEO_SI.2012.CW1M.5), 2 pages.

(Continued)

*Primary Examiner* — Tarifur R Chowdhury
*Assistant Examiner* — Jonathon Cook
(74) *Attorney, Agent, or Firm* — Mark A. Dodd

(57) ABSTRACT

An apparatus and a method for detecting rotation based on the Sagnac effect is disclosed. Input light having sufficient power is injected into a circulating optical resonator to thereby excite an optomechanical oscillation of the resonator at an instantaneous mechanical angular frequency. Rotation of the circulating optical resonator causes a change in a frequency of the optomechanical oscillation of the resonator, which in turn causes the instantaneous mechanical angular frequency to change. The optomechanical oscillation produces modulation sidebands in the resonating optical field at the instantaneous mechanical angular frequency and harmonics thereof, which are demodulated from the optical frequency by detection in a photodetector. Differences in the instantaneous mechanical angular frequency induced by rotation are detected by processing the photodetector output signal.

20 Claims, 11 Drawing Sheets

(56) References Cited

U.S. PATENT DOCUMENTS

| | | | | |
|---|---|---|---|---|
| 2014/0283601 | A1* | 9/2014 | Bhave | G01P 15/093 73/504.12 |
| 2014/0369699 | A1* | 12/2014 | Strandjord | G01C 19/721 398/187 |
| 2016/0069686 | A1* | 3/2016 | Lee | G01C 19/661 356/460 |
| 2016/0164458 | A1* | 6/2016 | Nguyen | H03H 9/2436 331/155 |
| 2016/0349283 | A1* | 12/2016 | Bramhavar | G01P 15/093 |

OTHER PUBLICATIONS

Hossein-Zadeh, M. et al., "Characterization of a radiation-pressure-driven micromechanical oscillator", Physical Review A 74, 023813 (2006), pp. 023813-1-023813-15.

Kippenberg, T.J. et al., "Cavity Opt-Mechanics", Optics Express, vol. 15, No. 25 (2007), pp. 17172-17205.

Li, S.-S. et al., "Micromechanical Hollow-Disk Ring Resonators", Proceedings, 17th Int. IEEE Micro Electro Mechanical Systems Conf., Maastricht, The Netherlands, Jan. 25-29, 2004, pp. 821-824.

Liang, W. et al., "Resonant microphotonic gyroscope", Optica, vol. 4, No. 1 (2017), pp. 114-117.

Liu, F. et al., "On the Spectrum of Radiation Pressure Driven Optomechanical Oscillator and Its Application in Sensing", Optics Communications 294 (2013) pp. 338-343.

Ma, H. et al., "Resonant Micro-optic Gyro Using a Short and High-finesse Fiber Ring Resonator", Optics Letters, vol. 40, No. 24 (2015), pp. 5862-5865.

Rocheleau, T.O. et al., Enhancement of mechanical Q for Low Phase Noise Optomechanical Oscillators, Jan. 20-24, 2013, 2013 IEEE 26th International Conference on Micro Electro Mechanical Systems (MEMS), 4 pages.

* cited by examiner

OPTOMECHANICAL GYROSCOPE UTILIZING THE SAGNAC EFFECT

CROSS-REFERENCE TO RELATED APPLICATION

This application claims the benefit of U.S. Provisional Application No. 62/545,172, filed Aug. 14, 2017, which is incorporated herein by reference.

ACKNOWLEDGEMENT OF GOVERNMENT SUPPORT

This invention was made with Government support under Contract No. DE-NA0003525 awarded by the United States Department of Energy/National Nuclear Security Administration. The Government has certain rights in the invention.

FIELD OF THE INVENTION

The invention relates to optically resonant sensing devices, and more particularly to devices for sensing rotation.

ART BACKGROUND

Gyroscopes are important for applications in navigation, guidance, and control. Many of these applications would benefit from miniaturization due to concerns with system cost, size, weight, and power. However, the possibilities for miniaturization are limited because the designs for conventional gyroscopes tend to exhibit better sensitivity and resolution at larger scales.

Consequently, there is a need for a new type of gyroscope that can be miniaturized with minimal to no impact on performance.

SUMMARY OF THE INVENTION

The inventors have developed a Sagnac effect-based optomechanical gyroscope (Sagnac OM gyroscope) for the sensing of rotation. This Sagnac OM gyroscope can be miniaturized with minimal to no impact on performance.

Rotation is detected through its effect on the mechanical angular frequency of a circulating optical resonator. Optomechanical oscillation arises because of the radiation pressure exerted on the circulating optical resonator by circulating light. Through the optomechanical spring effect, the mechanical angular frequency is sensitive to the optical flux within the circulating optical resonator. In turn, the optical flux depends on the amount of detuning between the circulating optical resonator and the optical frequency of the laser that drives it. The Sagnac effect provides the link between the amount of detuning and the externally imposed angular rotation of the circulating optical resonator.

The Sagnac effect is an interference phenomenon caused by rotation. A beam of light is split and one of the two resultant beams is injected into a circulating optical resonator that may be subject to rotation. In other embodiments, the two beams are both injected into the same circulating optical resonator, but in opposite directions. In yet other embodiments, the two beams are injected into two separate, but identical, circulating optical resonators, again in opposite directions. In each case, upon exiting the circulating optical resonator(s), the light beams are combined and undergo interference. The relative phases of the two beams, and thus the position of the interference fringes, are shifted according to the angular velocity of the circulating optical resonator(s). In operation, when the Sagnac OM gyroscope is irrotational, i.e., when the circulating optical resonator(s) is not rotating, the two beams travel at a constant speed and the position of the interference fringes does not change. However, when the Sagnac OM gyroscope is rotated, one beam will slow with respect to the other beam causing the position of the interference fringes to change.

Analysis of the Sagnac OM gyroscope has shown that reducing its size improves its sensitivity to rotation as measured by a scale factor equal to the ratio of the change in the mechanical angular frequency to the externally imposed angular rotation frequency.

Accordingly, the invention in a first embodiment relates to a method for detecting rotation. Input light is injected into a circulating optical resonator so as to excite an optical resonance within the resonator. "Circulating optical resonator" means a ring-shaped optical resonator, a disk-shaped optical resonator, or any other optical resonator in which the resonant optical field propagates around a closed curvilinear loop. The injected input light has a power level greater than a threshold for exciting optomechanical oscillation of the circulating optical resonator at a mechanical angular frequency.

Output light is taken from the circulating optical resonator and a modulation sideband, due to modulation of the input light at the mechanical angular frequency, is isolated, for example, by bandpass filtering of the output of a photodetector coupled so as to detect the output light. A measurement is made of the frequency shift of the modulation sideband from its frequency under irrotational conditions.

The invention in a second embodiment relates to a Sagnac OM gyroscope for detecting rotation. The Sagnac OM gyroscope includes a circulating optical resonator, a waveguide evanescently coupled to the resonator so as to provide an input path for input light to the resonator and an output path for output light from the resonator, a photodetector, and a signal-processing circuit.

The photodetector is coupled to the output path so as to receive at least a portion of the output light from the circulating optical resonator, and it is configured to provide an output detector signal in response to the coupled output light. The output detector signal includes the instantaneous mechanical angular frequency.

The signal-processing circuit is configured to determine the difference between the instantaneous mechanical angular frequency of the output detector signal and an irrotational mechanical angular frequency.

In other embodiments, the Sagnac OM gyroscope includes first and second circulating optical resonators, each having a respective input path for input light and a respective output path for output light, and each resonator being coupled through its respective output path to a respective photodetector. The light in the first circulating optical resonator circulates in the opposite direction of the light in the second circulating optical resonator. The signal-processing circuit is configured to determine the difference between the instantaneous mechanical angular frequencies of the two detector output signals.

In at least one embodiment, a respective bandpass filter is coupled to each of the photodetectors and configured to isolate an instantaneous mechanical angular frequency in the detector output signal before the detector output signal is provided to the signal-processing circuit.

In at least one embodiment, the signal-processing circuit is configured to mix the respective detector output signals so as to produce an output signal indicative of the difference between the instantaneous mechanical angular frequencies of the two detector output signals. For example, these operations may be provided by an analog phase detector with frequency mixing.

DETAILED DESCRIPTION

Figure 1:
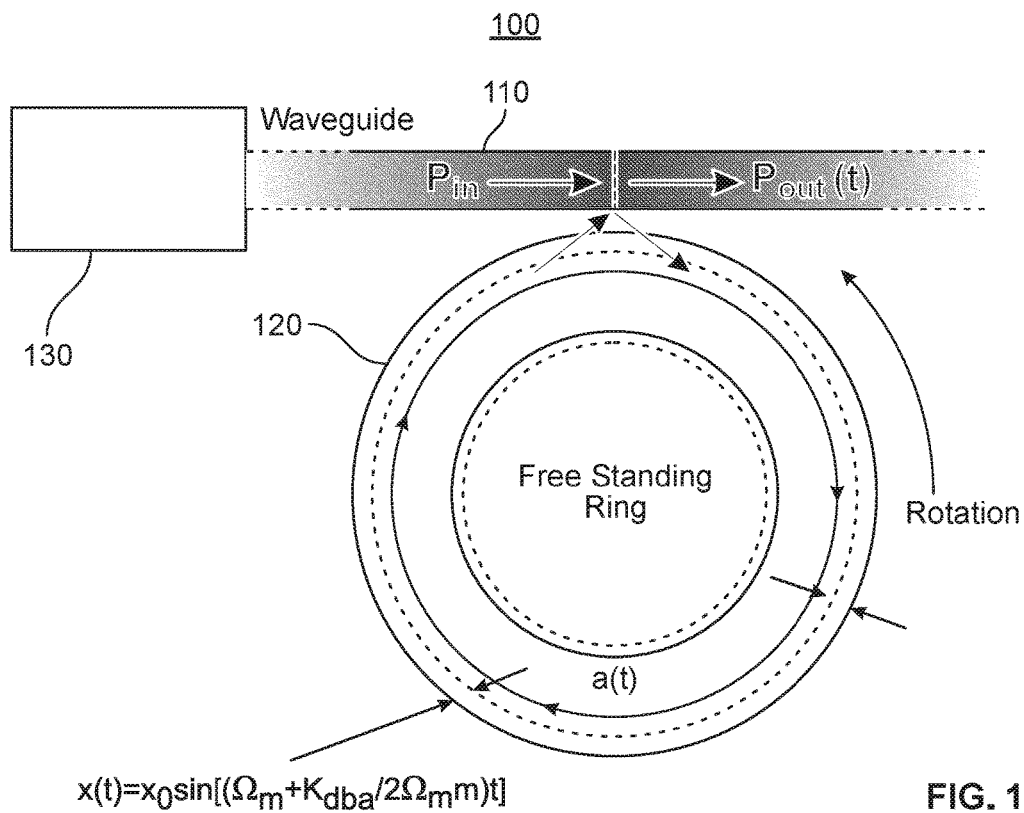
FIG. 1 is a plan view of a Sagnac OM gyroscope that includes a micro-ring circulating optical resonator and an evanescently coupled waveguide in accordance with at least one embodiment of the invention.

As illustrated in FIG. 1, a Sagnac OM gyroscope 100 in accordance with at least one embodiment includes a waveguide 110 evanescently coupled to an effectively free-standing circulating optical resonator 120 configured, e.g., as an optical micro-ring or micro-disk resonator. As is known in the art, the circulating optical resonator 120 can be made effectively free-standing by undercutting it with a suitable etchant in a process referred to as a release. In at least one embodiment of the invention, a released micro-ring circulating optical resonator is suspended over the substrate by laterally extending spokes or the like. In at least one other embodiment of the invention, a released micro-disk circulating optical resonator is supported from below by a pedestal.

For convenience, the geometrical configuration of the circulating optical resonator in the following discussion will be referred to as a "disk." However, this terminology is to be understood as non-limiting, and as inclusive of any other suitable resonator geometries, including a ring and other closed curvilinear loop geometries.

Optomechanical oscillation is excited by driving the circulating optical resonator 120 with a laser 130 whose optical output power exceeds the threshold required to overcome intrinsic mechanical damping and whose output wavelength is blue-shifted relative to the unperturbed resonant peak wavelength of the resonator 120. See T. O. Rocheleau et al., "Enhancement of Mechanical Q for Low Phase Noise Optomechanical Oscillators," IEEE 26th International Conference on Micro Electro Mechanical Systems (2013), which is incorporated herein by reference. Unperturbed means absent a perturbation by externally imposed angular rotation, i.e., under irrotational conditions. Blue-shifted means shifted toward a higher energy or, equivalently, toward a shorter wavelength and corresponding higher frequency.

In the absence of noise and rotation, the optomechanical oscillation frequency will occur at a mechanical angular frequency $\Omega_{m0}$. This mechanical angular frequency $\Omega_{m0}$ is also referred to as the "irrotational mechanical angular frequency." Due to modulation of the resonant wave by the vibrating circulating optical resonator 120, the spectral content of the output light will contain modulation sidebands displaced from the wavelength of the laser 130 by integer multiples of the mechanical angular frequency $\Omega_{m0}$.

Figure 2A:
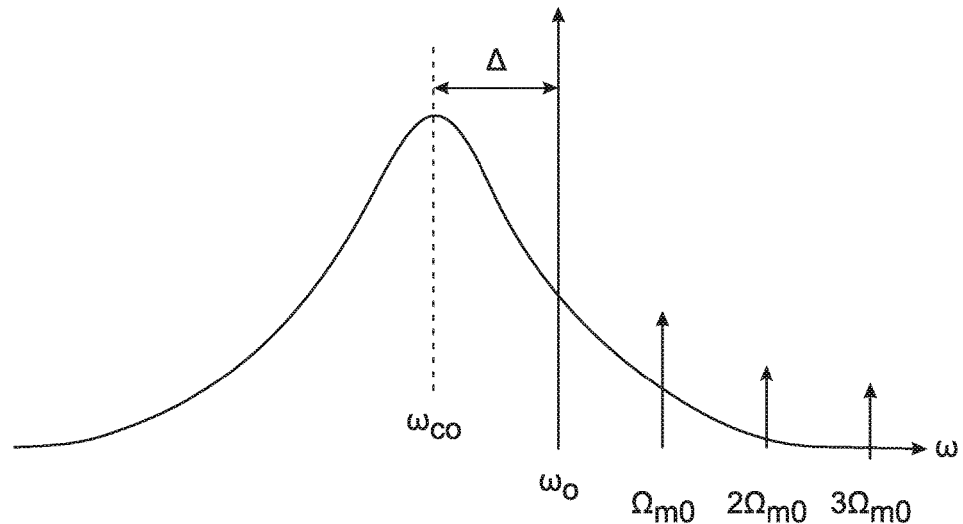
FIG. 2A is a frequency-domain representation that illustrates the detuning between the laser and the circulating optical resonator, and the sidebands when a Sagnac OM gyroscope in accordance with at least one embodiment of the invention is not subject to an externally imposed angular rotation.

Turning to FIG. 2A, it will be seen that the frequency $\omega_0$ of the laser 130 falls within the resonant bandwidth of the circulating optical resonator 120 but is blue-shifted, i.e., detuned, from the unperturbed peak resonant frequency $\omega_{c0}$ of the resonator 120 by an offset amount $\Delta=\omega_{c0}-\omega_0$. It will be seen that a first mechanical sideband appears at a positive offset $\Omega_{m0}$ from the laser frequency $\omega_0$, and that further sidebands, i.e., harmonics, appear at offsets that are integer multiples of $\Omega_{m0}$. Note that FIGS. 2A and 2B are qualitative in nature, not quantitative, to more clearly illustrate the operating principles of various embodiments of the present invention.

Figure 2B:
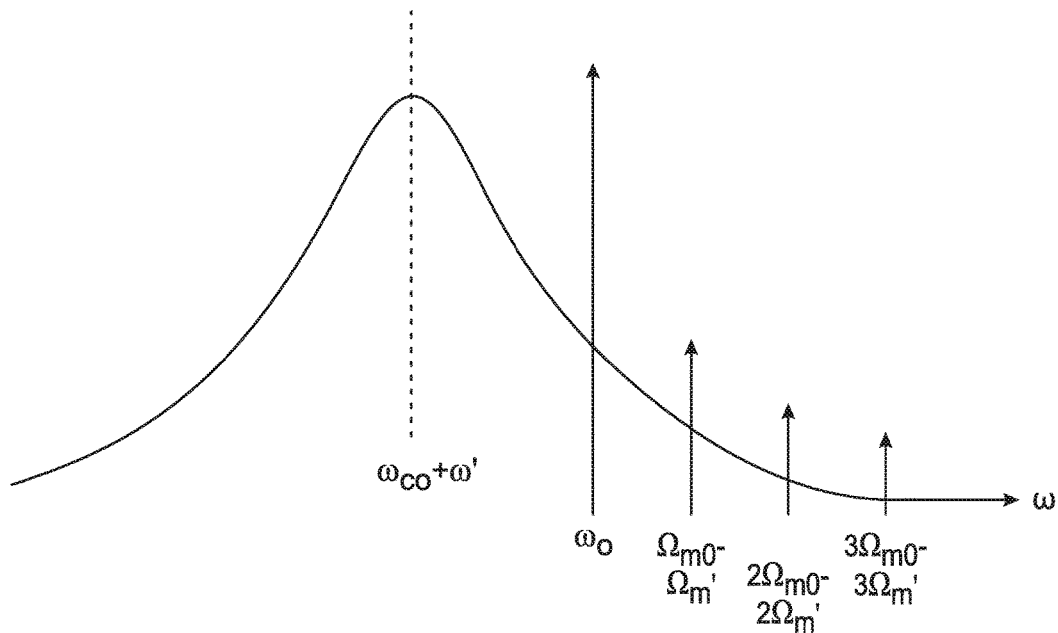
FIG. 2B is a frequency-domain representation that illustrates the detuning between the laser and the circulating optical resonator, and the sidebands when a Sagnac OM gyroscope in accordance with at least one embodiment of the invention is subject to an externally imposed angular rotation.

While FIG. 2A illustrates the various frequencies of the circulating optical resonator 120 under irrotational conditions, i.e., when the resonator 120 is not subjected to an externally imposed angular rotation, FIG. 2B illustrates the various frequencies when the circulating optical resonator 120 is subjected to an externally imposed angular rotation. An externally imposed angular rotation, acting through the Sagnac effect, causes the resonant frequency of the circulating optical resonator 120 to shift. As shown in FIG. 2B, this detuning shifts the unperturbed peak resonant frequency $\omega_{c0}$ by an amount $\omega'$.

The change in the detuning, acting through the optomechanical spring effect, also causes a corresponding shift $\Omega_m'$ in the mechanical angular frequency. Referring again to FIG. 2B, it will be seen that under an externally imposed angular rotation, the first sideband appears at an offset of $\Omega_{m0}-\Omega_m'$, and that the higher-order sidebands appear at integer multiples of this offset. Due to the imposed externally imposed angular rotation, the offset $\Omega_{m0}-\Omega_m'$ at any point in time during that rotation will be referred to as the "instantaneous mechanical angular frequency."

As those skilled in the art will appreciate, the frequency shift of the sidebands provides an indication of the externally imposed angular rotation frequency due to the Sagnac effect. In a sideband produced by an Nth-order harmonic (N being an integer ≥2), the rotation-induced frequency shift is multiplied by a factor of N. This can be especially advantageous when the harmonic sideband is stronger in power than the fundamental sideband. See F. Liu and M. Hossein-Zadeh, "On the Spectrum of Radiation Pressure Driven Optomechanical Oscillator and Its Application in Sensing," Opt. Comm. Vol. 294, PP. 338-343 (2013), which is incorporated herein by reference.

The frequency shift can be measured by comparing the output light of the circulating optical resonator 120 with the output of a reference oscillator, for example, the frequency $\omega_0$ of laser 130. However, better measurements may be obtained by comparing the outputs of two circulating optical resonators that are respectively excited by input light injected in oppositely circulating directions. In this dual circulating optical resonator embodiment of the present invention, the output signal magnitude is doubled and common-mode noise is reduced relative to a single circulating optical resonator embodiment of the present invention.

Figure 3:
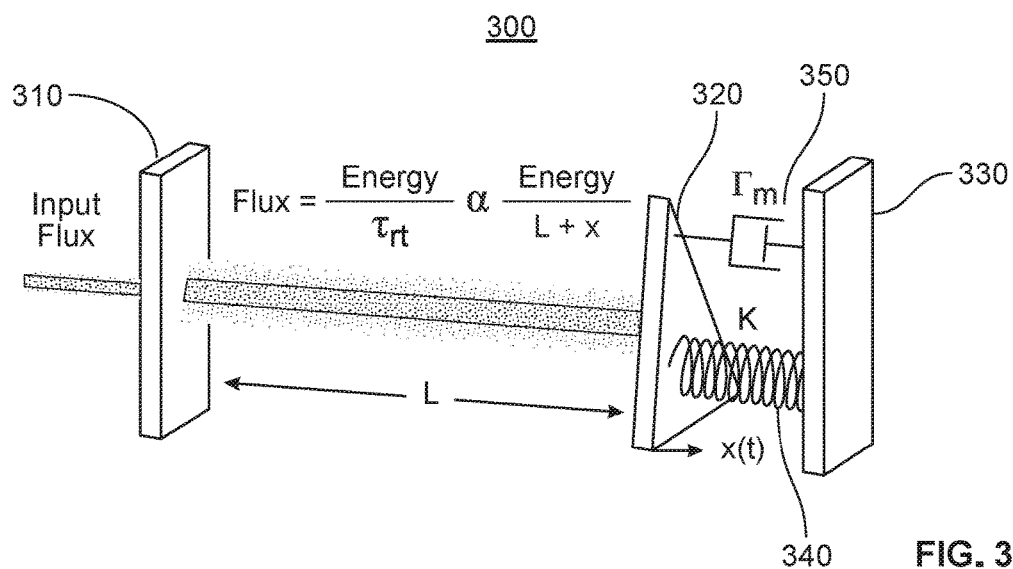
FIG. 3 is a schematic representation, in perspective view, of a simplified physical model for an optical resonator subject to optomechanical oscillation.

As seen in FIG. 3, illustrating a simplified model of at least one embodiment of the present invention subject to externally imposed angular rotation, an optical resonator 300 of length L+x(t) is defined between fixed mirror 310 and moveable mirror 320 attached to rigidly fixed anchor 330 by spring 340. The dynamics of moveable mirror 320 are defined by spring 340 with spring constant K (corresponding to the optomechanical stiffness referred to below) and damper 350 with a damping coefficient $\Gamma_m$.

The force F on moveable mirror 320 due to radiation pressure is proportional to the photon flux impinging on the moveable mirror 320, and it is inversely proportional to the moveable mirror position x(t). The photon flux, in turn, is proportional to the energy in the optical field, divided by the round-trip propagation time $\tau_{rt}$ within the optical resonator 300, which is proportional to the (one-way) propagation distance L+x(t).

Accordingly, an optomechanical stiffness $k_{dba}$ induced by dynamical back-action can be found, where $k_{dba}$ is defined as $\partial F/\partial x$. This linear optical resonator model thus shows that $k_{dba}$ is inversely proportional to $L^2$. Applying this linear optical resonator model to a disk circulating optical resonator shows that $k_{dba}$ in a disk of radius R will be inversely proportional to $R^2$. The mechanical angular frequency $\Omega_{m0}$ is given by the equation:

$$\Omega_{m0} = \sqrt{\frac{k_{dba}}{m_{eff}}} \quad (1)$$

with $m_{eff}$ being the effective mass of the circulating optical resonator. For disk-shaped circulating optical resonators, $m_{eff}$ is proportional to $R^2$, and $\Omega_{m0}$ is therefore proportional to $1/R$.

In the presence of optomechanics, the instantaneous mechanical angular frequency is given by:

$$\Omega = \sqrt{\Omega_{m0}^2 + \left(\frac{k_{dba}}{m_{eff}}\right)} \cong \Omega_{m0} + \Omega_m' \quad (2)$$

$$\Omega_m' = \frac{k_{dba}}{2\Omega_{m0} m_{eff}} \quad (3)$$

Back-substituting for each element's proportionality to R results in:

$$\Omega_m' = \frac{k_{dba}}{2\Omega_{m0} m_{eff}} \quad (4a)$$

$$\Omega_m' \propto \frac{\left(\frac{1}{R^2}\right)}{\left(\frac{1}{R}\right)(R^2)} \quad (4b)$$

$$\Omega_m' \propto \left(\frac{1}{R^3}\right) \quad (4c)$$

It will be seen from equation 4c that the shift $\Omega_m'$ in mechanical angular frequency due to the presence of the optical field is proportional to $1/R^3$ for a disk-shaped circulating optical resonator. This shows that the optomechanical spring effect is highly sensitive to radius.

One can calculate the optical resonant frequency of the rotating circulating optical resonator, $\omega_c$, by equating the round-trip phase to an integer multiple of $2\pi$:

$$\frac{\omega_c}{c/n_{eff}}(2\pi R) + \phi = 2\pi m \quad (5)$$

where m is a non-zero integer, c is the speed of light, and $n_{eff}$ is the effective refractive index in the circulating optical resonator. Solving for the optical resonant frequency, one obtains:

$$\omega_c = m\frac{c/n_{eff}}{R} - \phi\frac{c/n_{eff}}{2\pi R} \quad (6a)$$

$$\omega_c = \omega_{c0} + \omega' \quad (6b)$$

The Sagnac-induced shift $\omega'$ of the optical resonant frequency $\omega_{c0}$ due to rotation is then given by the following, where $\lambda_{c0}$ and $\omega_{c0}$ are respectively the optical resonant wavelength and frequency in the absence of rotation, and $\Omega_{rot}$ is the externally imposed angular rotation rate:

$$\omega' = -\frac{2\pi R n_{eff}}{\lambda_{c0}}\Omega_{rot} \quad (7a)$$

$$\omega' = -\omega_{c0}\frac{R\Omega_{rot}}{c/n_{eff}} \quad (7b)$$

The optomechanical stiffness $k_{dba}$ induced by dynamical back-action is given by:

$$k_{dba} = \frac{\omega_{c0}}{R^2}\frac{P_{in}\kappa_{ex}}{\left(\frac{\kappa}{2}\right)^2 + \Delta^2}\left[\frac{\Delta + \Omega_{m0}}{\left(\frac{\kappa}{2}\right)^2 + (\Delta + \Omega_{m0})^2} + \frac{\Delta - \Omega_{m0}}{\left(\frac{\kappa}{2}\right)^2 + (\Delta - \Omega_{m0})^2}\right] \quad (8)$$

where $P_{in}$ is the input optical power, $\kappa_{ex}$ the external coupling rate to a waveguide [rad/sec], $\Delta$ is the laser detuning ($\Delta=\omega_{c0}-\omega_0$), $\kappa$ is the loaded optical linewidth, i.e., the full width at half maximum (FWHM, in angular frequency units) of the loaded circulating optical resonator, and $\Omega_{m0}$ is the mechanical angular frequency of the unperturbed resonator. The term outside the brackets is just the radiation pressure force multiplied by $\delta\omega_c/\delta R$ while the term inside the brackets is proportional to the Lorentzian line shape evaluated at the stokes and anti-stokes sideband frequencies.

Assuming that $k_{dba}$ is in the unresolved sideband regime (see T. Kippenberg and K. Vahala, "Cavity Opto-Mechanics," Optics Express 15.25 (2007) 17172-17205, which is incorporated herein by reference), the optical linewidth and laser detuning are large compared to the mechanical angular frequency: $\kappa, \Delta \gg \Omega_{m0} \gg 1$. Setting $\Omega_{m0} \sim 0$ in equation (8) yields:

$$k_{dba} \approx \frac{2\omega_{c0}P_{in}\kappa_{ex}\Delta}{R^2\left(\left(\frac{\kappa}{2}\right)^2+\Delta^2\right)^2} \qquad (9)$$

The shift in the mechanical angular frequency in the presence of radiation pressure and rotation based upon equation (3) is:

$$\Omega'_m = \frac{k_{dba}}{2\Omega_{m0}m_{eff}} = \frac{\omega_{c0}P_{in}\kappa_{ex}\Delta}{m_{eff}\Omega_{m0}R^2\left(\left(\frac{\kappa}{2}\right)^2+\Delta^2\right)^2} \qquad (10)$$

Expanding the laser detuning, $\Delta$, and substituting equations (6b) and (7b) for the cavity resonant frequency, $\omega_c$, yields:

$$\Omega'_m = \frac{\omega_{c0}P_{in}\kappa_{ex}\left(\omega-\omega_{c0}\left(1-\frac{R\Omega_{rot}}{c}\right)\right)}{m_{eff}\Omega_{m0}R^2\left(\left(\frac{\kappa}{2}\right)^2+\left(\omega-\omega_{c0}\left(1-\frac{R\Omega_{rot}}{c}\right)\right)^2\right)^2} \qquad (11)$$

A Taylor expansion about $R\Omega_{rot}/c=0$, as $c \gg R\Omega_{rot}$, simplifies equation (11) to:

$$\Omega'_m \approx \frac{\omega_{c0}P_{in}\kappa_{ex}}{m_{eff}\Omega_{m0}R^2\left(\left(\frac{\kappa}{2}\right)^2+\Delta_0^2\right)^2}\left[\Delta_0+\left(1-\frac{4\Delta_0^2}{\left(\frac{\kappa}{2}\right)^2+\Delta_0^2}\right)\omega_{c0}\frac{R\Omega_{rot}}{c}\right] \qquad (12a)$$

$$\Omega'_m=\Omega'_m(dba)+\Omega'_m(Rot) \qquad (12b)$$

where $\Omega'_m$ (dba) is the dynamical back-action contribution to the mechanical angular frequency and $\Delta_0$ is the laser detuning under irrotational conditions. $\Omega'_m$ (Rot) is the correction to the mechanical angular frequency due purely to rotation, and is given by:

$$\Omega'_m(Rot) = \frac{\omega_{c0}^2 P_{in}\kappa_{ex}}{m_{eff}\Omega_{m0}Rc\left(\left(\frac{\kappa}{2}\right)^2+\Delta_0^2\right)^3}\left(\left(\frac{\kappa}{2}\right)^2-3\Delta_0^2\right)\Omega_{rot} \qquad (13)$$

Looking at the scaling of equation (13) with respect to radius R, the unperturbed mechanical frequency, $\Omega_{m0}$, scales as $1/R$ and the effective mass, $m_{eff}$, scales with $R^2$ for a disk-shaped circulating optical resonator. The loaded optical linewidth remains essentially constant for radius R values greater than about 40 μm for PSG and greater than about 10 μm for bulk silicon nitride circulating optical resonators. Assuming the radius R is kept above the critical radius at which the loaded optical linewidth begins to degrade, there is a $1/R^2$ pre-factor multiplying the terms in parentheses in equation (13). Thus, unlike traditional optical and MEMs gyroscopes, the signal is enhanced by reducing the radius in a Sagnac OM gyroscope in accordance with at least one embodiment of the present invention.

The scale factor in the unresolved sideband regime is then:

$$\frac{\Omega'_m(Rot)}{\Omega_{rot}} = \frac{2\omega_{c0}^2 P_{in}\kappa_{ex}}{m_{eff}\Omega_{m0}Rc\left(\left(\frac{\kappa}{2}\right)^2+\Delta_0^2\right)^3}\left(\left(\frac{\kappa}{2}\right)^2-3\Delta_0^2\right) \qquad (14)$$

which results in the scale factor being proportional to $1/R^2$. Note that equation (14) was multiplied by a factor of two due to the differential output, described in reference below to FIG. 6, which doubles the signal.

The optical quality factor $Q_{Opt}$ is only weakly dependent on radius R for a bulk silicon nitride disk-shaped circulating optical resonator for R>10 μm and for a PSG disk-shaped resonator for R>40 Under the assumption that $Q_{Opt}$ is independent of radius, the scale factor $\Omega'_m(Rot)/\Omega_{rot}$ for the circulating optical resonator is expected to scale as $1/R^2$ in disk-shaped resonators and roughly as $1/R$ in ring-shaped resonators.

Figure 4:
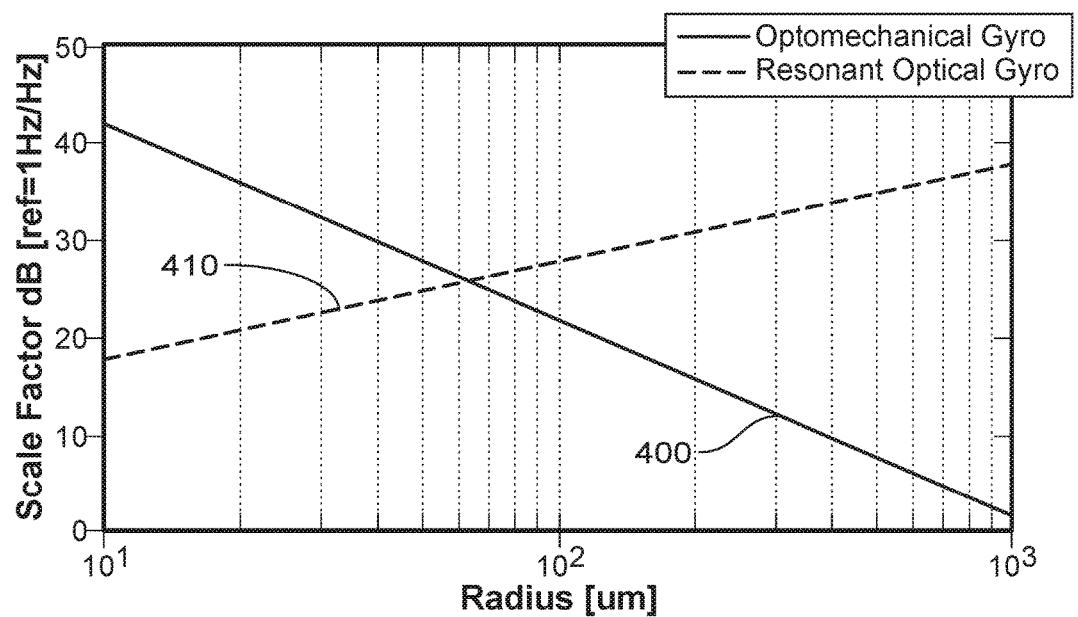
FIG. 4 provides a plot of the theoretical scale factor as a function of disk radius for a Sagnac OM gyroscope in accordance with at least one embodiment of the invention. For comparison, a similar plot for a conventional resonant optical gyroscope is also provided in the figure.

FIG. 4 provides a plot (falling curve 400) of the theoretical scale factor as a function of radius R for a Sagnac OM gyroscope having a disk-shape circulating optical resonator in accordance with at least one embodiment of the invention. For comparison, a similar plot (rising curve 410) for a conventional resonant optical gyroscope is also provided in FIG. 4. In the model gyroscopes used for calculating the plots shown in FIG. 4, the circulating optical resonator material was 2-μm-thick PSG, the optical quality factor $Q_{Opt}$ was 10,000,000, and the mechanical quality factor $Q_{Mech}$ was 7000 at a mechanical angular frequency $\Omega_m$ of 18 MHz. The slope of −20 dB per decade for the Sagnac OM gyroscope in accordance with at least one embodiment of the invention confirms a $1/R^2$ dependence.

It will be understood from FIG. 4 that for small values of R, (e.g., R less than 60 μm in the present example), the scale factor for the Sagnac OM gyroscope in accordance with at least one embodiment of the invention is greater than the scale factor for the conventional resonant optical gyroscope.

Based upon above equation (14) for $\Omega'_m(Rot)/\Omega_{rot}$, it can be observed that the scale factor is highly sensitive to the loaded optical linewidth $\kappa$. As a consequence, a high optical quality factor $Q_{Opt}$ is necessary.

Thermomechanical Brownian motion was considered in order to estimate a fundamental noise limit for a Sagnac OM gyroscope in accordance with at least one embodiment of the invention. Starting with the Sagnac OM gyroscope output as:

$$\text{Output}=K\Omega_{rot}+\text{Offset}+\text{Noise}(t), \qquad (15)$$

with K being the scale factor defined above as $\Omega'_m(Rot)/\Omega_{rot}$. As long as the offset is repeatable, then it can be calibrated out. Since one cannot calibrate out the time varying noise, the Brownian-based noise limit can be defined as a noise equivalent rotation rate:

$$\Omega_{noise} = \text{Noise}(t)/K. \quad (16)$$

Turning next to the Schawlow-Townes equation for linewidth narrowing, in accordance with M. Hossein-Zadeh et al., "Characterization of a Radiation-pressure-driven Micromechanical Oscillator," Phys. Rev. A, Vol. 74, No. 2, PP. 023813-1-023813-15 (2006), which is incorporated herein by reference, one finds:

$$\delta\Omega = \frac{1}{Q_{Mech}} \cdot \frac{k_B T}{m_{eff} \Omega_m x^2} \quad (17)$$

in which $k_B$ is the Boltzmann constant, T is temperature, and x is the mechanical oscillation amplitude. Through numerical simulation of a disk-shaped circulating optical resonator, it was determined that $\delta\Omega$ has a $1/R^3$ dependence.

The Allan deviation $\sigma(\tau)$, which is a measure of frequency stability in an oscillator during an averaging time $\tau$, is:

$$\sigma(\tau) = \sqrt{\delta\Omega/\Omega_m^2/2\tau} \quad (18)$$

Back substituting in the Allan deviation found in equation (18) for each element's R dependence reveals:

$$\sigma(\tau) \propto \sqrt{\frac{1}{R^3} \bigg/ \frac{1}{R^2}} \quad (19a)$$

$$\sigma(\tau) \propto 1/\sqrt{R} \quad (19b)$$

Returning to equation (16) and the noise equivalent rotation rate:

$$\Omega_{noise} = \frac{\sigma(\tau) \cdot \Omega_m}{K} \quad (20)$$

Again, back substituting for each element's R dependence shows:

$$\Omega_{noise} \propto \frac{(1/\sqrt{R}) \cdot (1/R)}{1/R^2} \quad (21a)$$

$$\Omega_{noise} \propto \sqrt{R} \quad (21b)$$

As the signal-to-noise ratio is inversely proportional to $\Omega_{noise}$, the signal-to-noise ratio is therefore proportional to $1/\sqrt{R}$. Consequently, and in contrast to a conventional resonant optical gyroscope, the angle random-walk-limited resolution in at least some embodiments of the present invention due to Brownian motion is expected to improve as the disk radius R decreases.

Figure 5:
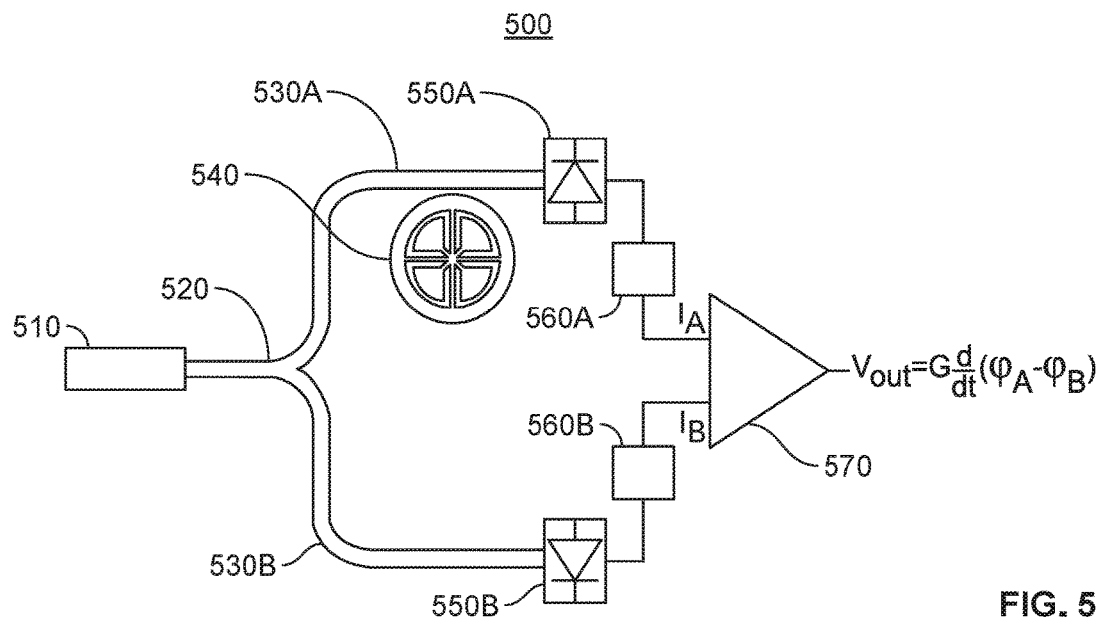
FIG. 5 is a simplified schematic diagram of a Sagnac OM gyroscope that includes a single optomechanical resonator with a single input in accordance with at least one embodiment of the invention.

FIG. 5 is a simplified schematic diagram of a Sagnac OM gyroscope 500 that includes a single circulating optical resonator 540 in accordance with at least one embodiment of the invention. A laser 510 injects light, via an optical splitter 520, into a pair of waveguide arms 530A, 530B. The waveguide arm 530A is evanescently coupled to the circulating optical resonator 540, thereby injecting input light into the resonator 540. The waveguide arm 530A then receives output light from the circulating optical resonator 540 and delivers it to a photodetector 550A. The waveguide arm 530B delivers its light to a photodetector 550B. The electrical output signals from each of the photodetectors 550A, 550B are processed by respective bandpass filters 560A, 560B to produce the filtered photocurrents $I_A$ and $I_B$. The filtered photocurrents $I_A$ and $I_B$ are operated on by a signal-processing circuit 570 to provide an output signal $V_{out}$.

In a preferred embodiment of the present invention, the photocurrents from the photodetectors 550A, 550B will be amplified by a gain factor G (exemplarily by transimpedance amplifiers, not illustrated) either before or after bandpass filtering by a respective bandpass filter 560A, 560B. The bandpass filters 560A, 560B are used to isolate the desired harmonic from the circulating optical resonator 540. When transimpedance amplifiers are employed, instead of filtered photocurrents $I_A$ and $I_B$, the input signals to the signal-processing circuit 570 will be amplified and filtered photo-voltages $V_A$ and $V_B$.

In the single circulating optical resonator arrangement of FIG. 5, the instantaneous mechanical angular frequency of the desired harmonic from the circulating optical resonator 540 is subtracted from the fixed frequency of the laser 510, i.e., as carried by $I_A$ and $I_B$ (or $V_A$ and $V_B$), in the signal-processing circuit 570.

The output voltage signal represented in the figure by $$V_{out} = G \frac{d}{dt}(\varphi_A - \varphi_B)$$

is an example output signal produced by the signal-processing circuit 570 employing an analog phase detector that uses frequency mixing. The output of the frequency mixer is proportional to a phase difference, which is the frequency difference multiplied by time. In order to isolate the frequency difference, the frequency mixer output is differentiated with respect to time.

It will be understood that a signal-processing circuit 570 comprising an analog phase detector is a nonlimiting example, and that alternative signal processing methods are also suitable, including digital methods for frequency mixing and phase detection. To the extent a digital signal-processing circuit is employed, the analog output from the photodetectors 550A, 550B may be digitized by an analog-to-digital converter (ADC). Alternatively, to the extent a digital signal-processing circuit is employed, the analog output from the bandpass filters 560A, 560B may be digitized by an ADC. As yet another alternative, to the extent a digital signal-processing circuit is employed, the analog output from the transimpedance amplifiers, not illustrated, may be digitized by an ADC. It will also be understood that once the signal has been digitized, it may be bandpass filtered in the digital domain and/or it may undergo amplification in the digital domain. As the ADC may be placed at a number of different points within the electrical signal path, use of the term "electrically coupled" means coupled either directly or indirectly, i.e., via one or more intervening electrical elements.

Figure 6:
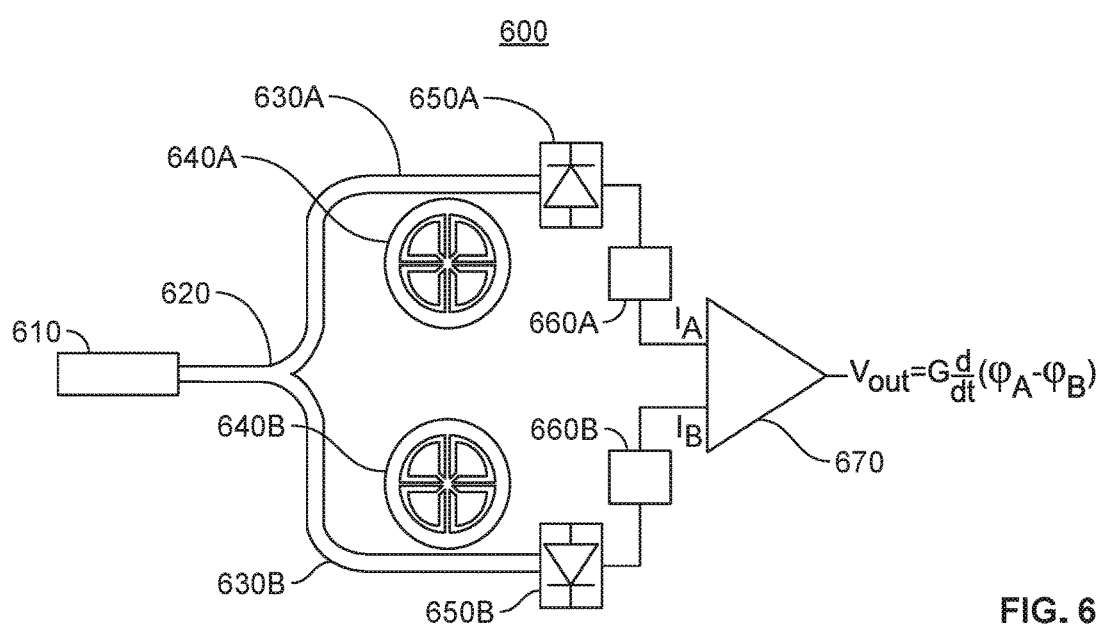
FIG. 6 is a simplified schematic diagram of a Sagnac OM gyroscope that includes dual optomechanical resonators, each with a corresponding input, in accordance with at least one embodiment of the invention.

FIG. 6 is a simplified schematic diagram of a Sagnac OM gyroscope 600 that includes dual circulating optical resonators 640A, 640B in accordance with at least one embodiment of the invention. A laser 610 injects light, via optical splitter 620, into waveguide arms 630A, 630B. The waveguide arm 630A is evanescently coupled to the circulating optical resonator 640A, thereby injecting input light into the resonator 640A in a clockwise direction. The waveguide arm 630B is evanescently coupled to the circulating optical resonator 640B, thereby injecting input light into the resonator 640B in a counter-clockwise direction, i.e., the opposite direction of the input light injected by the waveguide arm 630A. Each waveguide arm 630A, 630B then delivers output light from the circulating optical resonators 640A, 640B to a respective photodetector 650A, 650B. The electrical output signal from each photodetector 650A, 650B is processed by a respective bandpass filter 660A, 660B to produce the filtered photocurrents $I_A$ and $I_B$. The filtered photocurrents $I_A$ and $I_B$ are operated on by a signal-processing circuit 670 to provide output signal $V_{out}$.

In a preferred embodiment of the present invention, the photocurrent from the photodetectors 650A, 650B will be amplified by a gain factor G (exemplarily by transimpedance amplifiers) either before or after bandpass filtering by a respective bandpass filter 660A, 660B. The bandpass filters 660A, 660B are used to isolate the desired harmonic from each circulating optical resonator 640A, 640B. When transimpedance amplifiers are employed, instead of filtered photocurrents $I_A$ and $I_B$, the input signals to the signal-processing circuit 670 will be amplified and filtered photovoltages $V_A$ and $V_B$.

In the dual circulating optical resonator arrangement of FIG. 6, the instantaneous mechanical angular frequencies of the desired harmonic from respective circulating optical resonators 640A, 640B, i.e., as carried by $I_A$ and $I_B$ (or $V_A$ and $V_B$), are subtracted one from the other in the signal-processing circuit 670. This advantageously doubles the signal amplitude while eliminating common-mode noise.

The output voltage signal represented in the figure by $$V_{out} = G\frac{d}{dt}(\varphi_A - \varphi_B)$$

is an example output signal produced by the signal-processing circuit 670 employing an analog phase detector that uses frequency mixing. The output of the frequency mixer is proportional to a phase difference, which is the frequency difference multiplied by time. In order to isolate the frequency difference, the frequency mixer output is differentiated with respect to time.

It will be understood that a signal-processing circuit 670 comprising an analog phase detector is a nonlimiting example, and that alternative signal processing methods are also suitable, including digital methods for frequency mixing and phase detection. To the extent a digital signal-processing circuit is employed, the analog output from the photodetectors 650A, 650B may be digitized by an ADC. Alternatively, to the extent a digital signal-processing circuit is employed, the analog output from the bandpass filters 660A, 660B may be digitized by an ADC. As yet another alternative, to the extent a digital signal-processing circuit is employed, the analog output from the transimpedance amplifiers, not illustrated, may be digitized by an ADC. It will also be understood that once the signal has been digitized, it may be bandpass filtered in the digital domain and/or it may undergo amplification in the digital domain.

Figure 7:
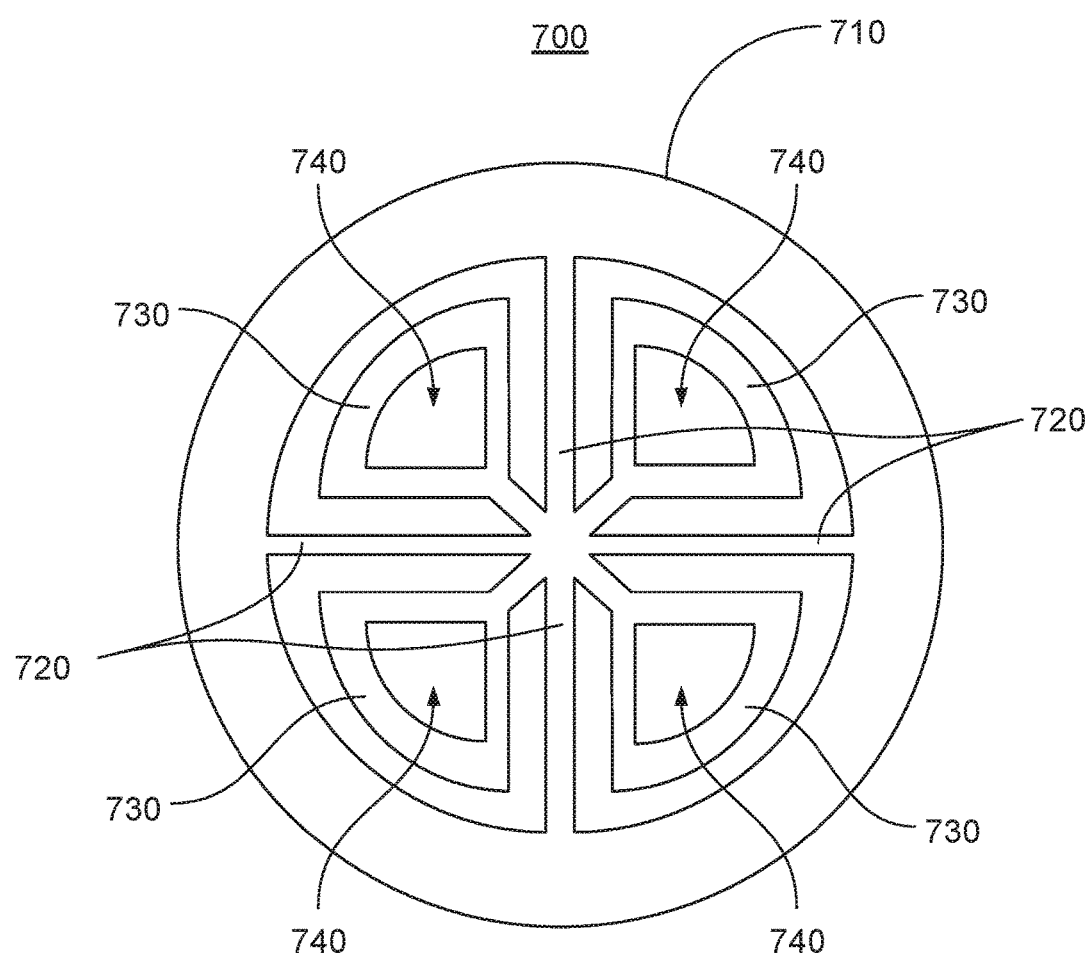
FIG. 7 is a plan view of a lithographically fabricated micro-ring circulating optical resonator in accordance with at least one embodiment of the invention.

FIG. 7 is a plan view of a lithographically fabricated micro-ring circulating optical resonator 700 in accordance with one or more embodiments of the present invention. As seen in FIG. 7, the micro-ring circulating optical resonator 700 includes a ring 710, four spokes 720, and four anchors 730. The anchors 730 each include respective pedestal regions 740 that connect directly to the substrate, not illustrated, and support overlying shelf-like portions of the anchors 730 from below. The waveguide used to evanescently couple light to and from the ring 710 is not illustrated in FIG. 7.

A typical ring 710 has a radius R in the range of 10-200 µm, though the radius R is preferably in the range of 10-30 µm for a ring 710 formed of PSG and in the range of 40-60 µm for a ring 710 formed of bulk SiN. Typical widths for the ring 710 are in the range of 3-10 while typical widths for the spokes 720 are in the range of 0.5-3 µm. An example material composition for the ring 710, as well as for the evanescently coupled waveguide, not illustrated, is PSG. An alternative composition is bulk SiN. Other compositions are considered to lie within from the scope of the invention.

It should be noted that the circulating optical resonator design of FIG. 7 is only one non-limiting embodiment of the present invention. Other geometries, including disks or other closed curvilinear loops, are possible and are considered to lie within the scope of the present invention.

In one alternative embodiment of the present invention, each anchor 730 includes a plurality of small holes. The small holes may be, for example, 1.5 µm wide and 3 µm deep. An advantage offered by such holes is that they are unlikely to be filled by photoresist that is spun onto the wafer at a typical rotational speed such as 3K rpm. As a consequence, the total amount of surface topography that is of account in subsequent lithographic processing can be reduced, i.e., these small holes eliminate the need for planarization that may be required for large anchors 730, as planarization is needed for good lithography during subsequent patterning.

It should also be noted that the spokes 720 are advantageous because they increase the mechanical quality factor $Q_{Mech}$ of the micro-ring circulating optical resonator 700. That is, propagation of acoustic waves into the anchor 730 is a loss mechanism. The spokes 720 reduce this loss because they offer only a thin channel for acoustic propagation toward the anchor 730.

Although narrower spokes 720 lead to less acoustic loss, there is a limit to how narrow they can be made. That is, if the spokes 720 are made too narrow, they will fail to support the ring 710 properly. For example, if stress is present in the ring 710, it may tend to curl up if it receives inadequate support from the spokes 720. Because stress tends to bend the ring 710 out of plane, the width of the spokes 720 should increase as the radius R increases in order to provide adequate support. By way of illustration, a design study on bulk silicon nitride rings showed that for a ring 710 having a radius R greater than 50 µm, it would be necessary to use spokes 720 wider than 2 µm. See S.-S. Li et al., "Micromechanical 'Hollow-Disk' Ring Resonators," 17th IEEE International Conference on Micro Electro Mechanical Systems (2004), which is incorporated herein by reference.

Any of following fabrication processes may be used to make Sagnac OM gyroscopes in accordance with the various embodiments of the invention as described herein.

PSG Timed Release Process with Pedestal.

Figure 8A:
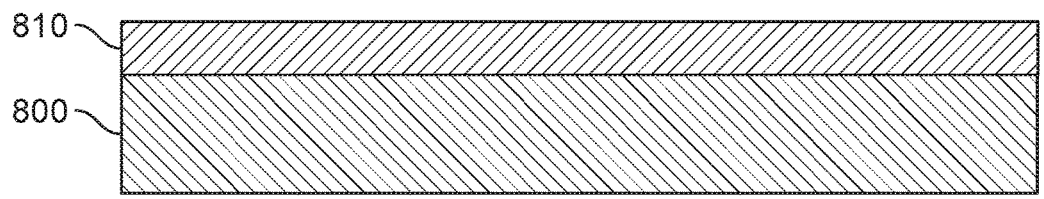
FIGS. 8A-8D illustrate an example process in which phosphosilicate glass (PSG) optics are formed on a silicon substrate in accordance with at least one embodiment of the invention.

FIGS. 8A-8D illustrate an example process in which PSG optics are formed on a silicon substrate. As shown in FIG. 8A, a PSG layer 810 having a thickness of 2 µm is deposited by low-pressure chemical vapor deposition (LPCVD) on a silicon substrate wafer 800. In an at least one embodiment of the present invention, 6%/wt PSG, i.e., glass that is 6% phosphorus by weight, is used. A range of at least from 4% to 7% of phosphorus by weight is considered to be similarly useful. The silicon substrate wafer 800 is optionally densified at 900° C. for one hour in nitrogen at ambient pressure, followed by an optional step of dry oxidation for 15 minutes at 900° C. The silicon substrate wafer 800 is then subjected to wet oxidation for 1.65 hours at 900° C. to prevent bubble formation. (This technique for bubble suppression was privately communicated by Dr. Karen Grater of the Laboratory for Physical Sciences, College Park, Maryland, based on research conducted at the University of California, Berkeley.)

Figure 8B:
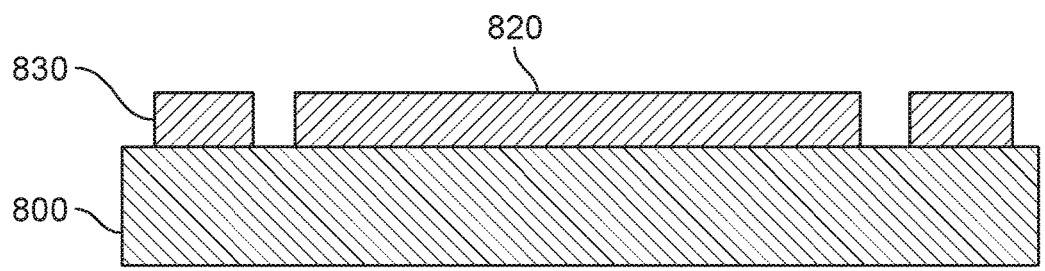
Figure 8C:
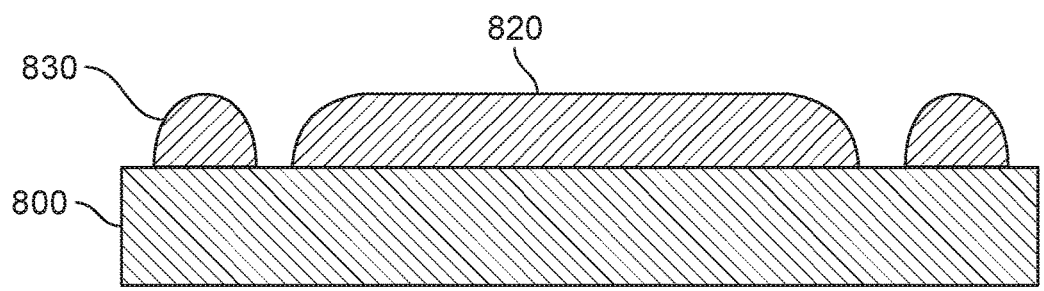

As shown in FIG. 8B, the PSG layer 810 is lithographically patterned and subjected to a plasma etch with a $C_4F_8$/oxygen gas mixture to define the disk 820 and waveguides 830. The photoresist is then stripped from the silicon substrate wafer 800. The stripping step may comprise subjecting the silicon substrate wafer 800 to an ashing process and/or a piranha rinse. After stripping the photoresist, the silicon substrate wafer 800 is annealed at 1050° C. for four hours in nitrogen at ambient pressure. The post-anneal conformation of the disk 820 and waveguides 830 is shown in FIG. 8C. The silicon substrate wafer 800 is then diced.

Figure 8D:
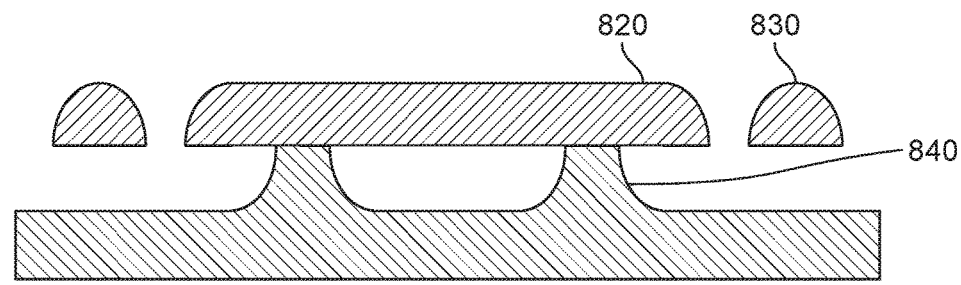

As shown in FIG. 8D, each die is then subjected to a xenon difluoride etch for a controlled period of time. This etch is permitted to go on long enough to undercut the waveguides 830 and to partially undercut the disk 820, leaving a pedestal 840 to support the disk 820.

PSG Process on SOI with Anchors.

Figure 9A:
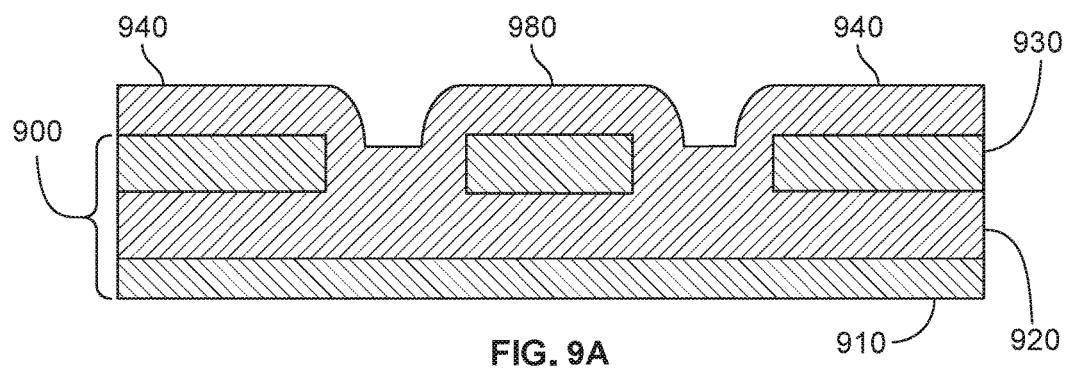
FIGS. 9A-9C illustrate a process in which PSG optics are formed on an SOI substrate wafer in accordance with at least one embodiment of the invention.
Figure 9B:
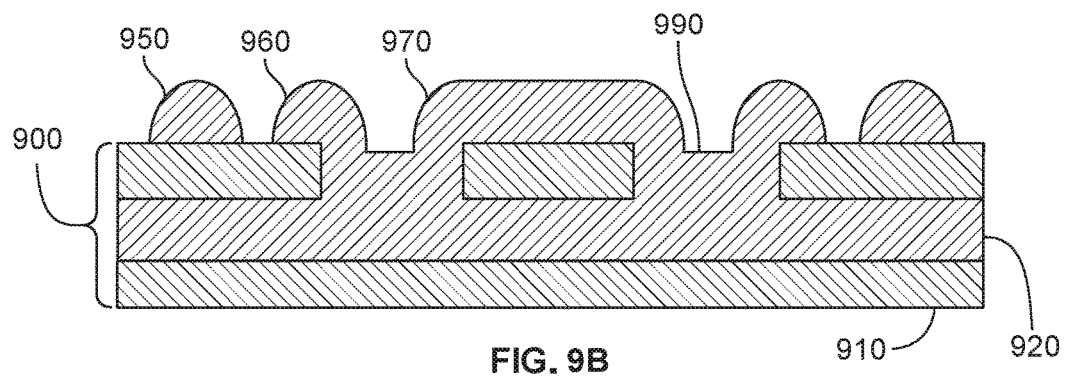
Figure 9C:
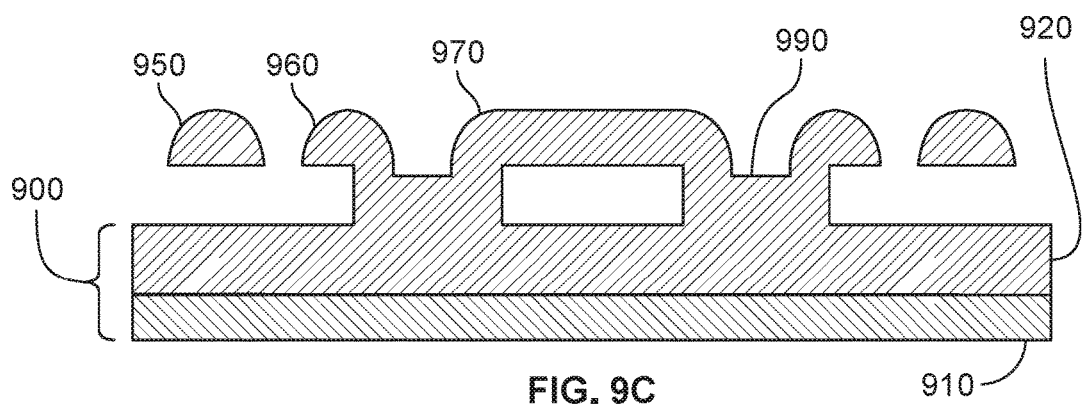

FIGS. 9A-9C illustrate an example process in which PSG optics are formed on an SOI substrate wafer. As shown in FIG. 9A, an SOI wafer 900 is provided, having a bottom silicon layer 910, a buried oxide (BOX) layer 920, and a top silicon layer 930. The top silicon layer 930 is patterned and etched to form sacrificial mesas 940 that will temporarily underlie the waveguide features 950, the ring features 960, and the spoke features 970. The photoresist used in the patterning of the top silicon layer 930 is then stripped from the BOX layer 920. A PSG layer 980 is deposited so as to overlie both the sacrificial mesas 940 and the exposed BOX layer 920. The wafer 900 is subjected to wet oxidation for 1.65 hours at 900° C. to prevent bubble formation.

As shown in FIG. 9B, the PSG layer 980 is patterned and etched to form waveguide features 950, ring features 960, and spoke features 970. The PSG layer 980 deposited on the exposed BOX layer 920 between the spoke features 970 and the ring features 960 forms the anchor regions 990 for supporting the spoke features 970 and the ring features 960. The photoresist used in the patterning of the PSG layer 980 to form the waveguide features 950, the ring features 960, and the spoke features 970 is then stripped. The PSG layer 980 is preferably then reflowed in a nitrogen anneal.

As shown in FIG. 9C, the wafer 900 is then subjected to a xenon difluoride etch to remove the sacrificial mesas 940 without substantially etching the PSG layer 980. This results in the release of the waveguide features 950, the ring features 960, and the spoke features 970. The wafer 900 is then diced.

A useful reference on PSG photonic integrated circuit platforms for optomechanical systems is K. E. Grater et al., "A Platform for On-Chip Silica Optomechanical Oscillators with Integrated Waveguides," Conference on Lasers and Electro-Optics 2012, OSA Technical Digest, paper CW1M.5, which is hereby incorporated herein by reference.

Bulk Silicon Nitride on Silicon Process with Anchors.

Figure 10A:
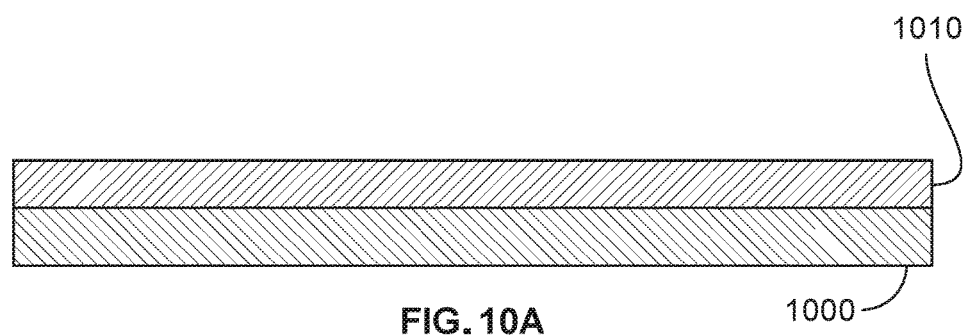
FIGS. 10A-10F illustrate an example process in which bulk silicon nitride (SiN) optics are formed on a silicon substrate wafer in accordance with at least one embodiment of the invention.

FIGS. 10A-10F illustrate an example process in which bulk SiN optics are formed on a silicon substrate wafer. As shown in FIG. 10A, a thermal oxide layer 1010 having a thickness of 3 μm is grown on a silicon wafer 1000 by LPCVD wet oxidation.

Figure 10B:
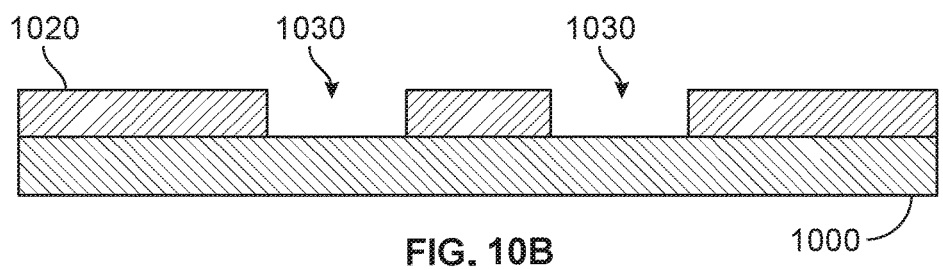

As shown in FIG. 10B, the thermal oxide layer 1010 is patterned and etched to define sacrificial mesas 1020 and anchor regions 1030 of exposed silicon. Suitable etching processes for the oxide include reactive ion etching (ME) and etching in inductively coupled oxygen plasma. The photoresist used in the patterning of the thermal oxide layer 1010 to form the sacrificial mesas 1020 and anchor regions 1030 is then stripped.

Figure 10C:
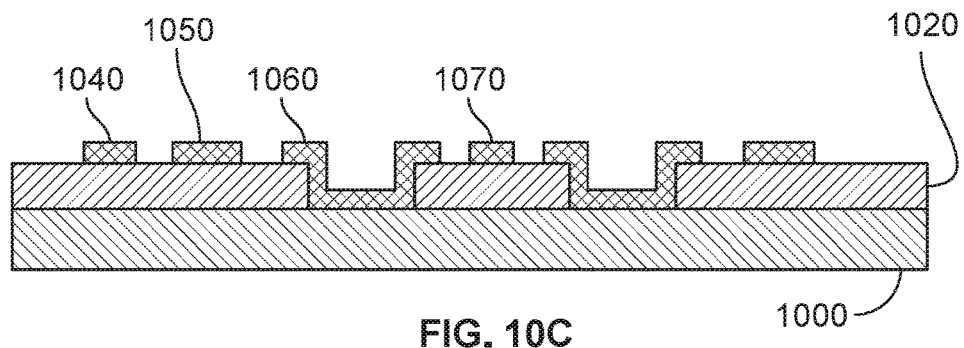

The silicon wafer 1000 may optionally be planarized. Then, as shown in FIG. 10C, a stoichiometric SiN layer having a thickness of 275 nm is deposited over the thermal oxide layer 1010 and over the exposed portions of the silicon wafer 1000 at a temperature of about 800° C. The silicon wafer 1000 is annealed at 1200° C. for one hour to drive out hydrogen impurities.

The silicon wafer 1000 is then optionally planarized by depositing a thermal silicon dioxide layer, not illustrated, and subjecting the silicon wafer 1000 to a chemical-mechanical polish (CMP) process. A wet etch to remove the thermal silicon dioxide layer completes the planarization and exposes the SiN layer.

The SiN layer is then patterned and etched using, for example, a dry etch in an ME or inductively coupled plasma (ICP) tool. As shown in FIG. 10C, the etched SiN layer exhibits waveguide features 1040, ring features 1050, anchor features 1060, and spoke features 1070. The photoresist used in the patterning of the SiN layer to form the waveguide features 1040, the ring features 1050, the anchor features 1060, and the spoke features 1070 is then stripped.

Figure 10D:
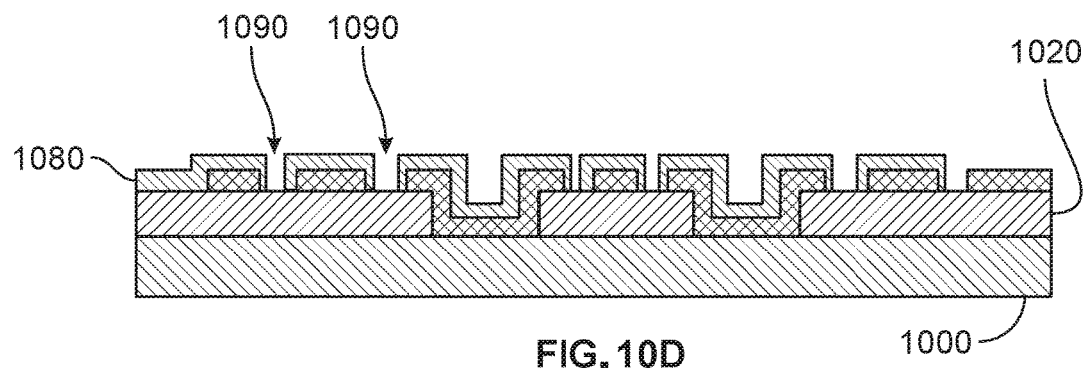

As shown in FIG. 10D, a polysilicon hard mask layer 1080 having a thickness of 200 nm is conformally deposited by CVD at about 580° C. and annealed at 1200° C. for one hour. The hard mask layer 1080 is patterned and etched by RIE, stopping on the surface of the sacrificial mesas 1020. The patterning and etching of the hard mask layer 1080 leaves openings 1090 through which the sacrificial mesas 1020 can be removed in the subsequent release step. The photoresist used in the patterning of the hard mask layer 1080 to form the openings 1090 is then stripped.

Figure 10E:
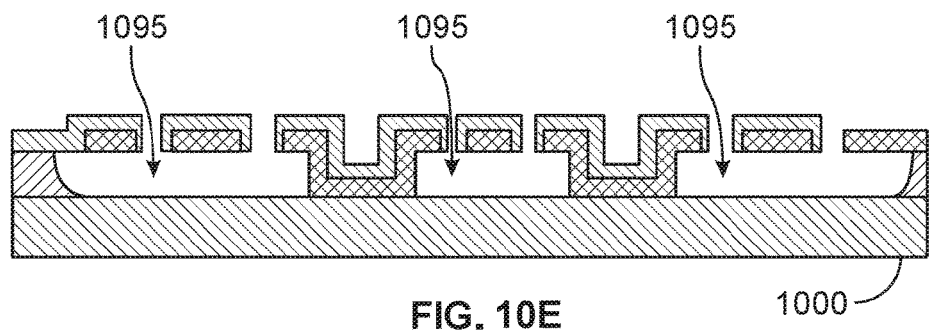

As shown in FIG. 10E, the bulk silicon nitride waveguide features 1040, the ring features 1050, the anchor features 1060, and the spoke features 1070 are released by a buffered oxide etch (BOE) that removes the sacrificial mesas 1020, thereby creating cavities 1095.

Figure 10F:
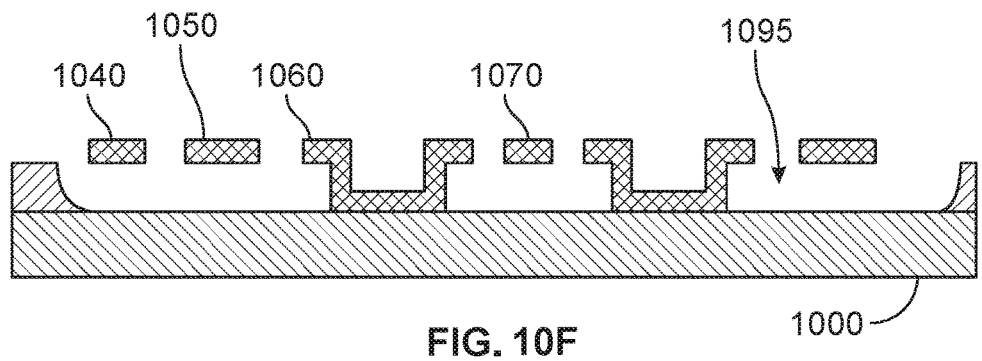

As shown in FIG. 10F, the hard mask layer 1080 is stripped away. The facets for the waveguides, not illustrated, are then defined by lithographic patterning of streets and deep reactive ion etching (DRIE). A facet in this regard is the face of the waveguide feature 1040 at a chip interface after singulation of the silicon wafer 1000. The facet is etched in order to provide a smooth face for efficient coupling of light therethrough. A street is a border around the edge of a singulated chip. It is an exclusion region that provides for dicing and for the facet etch.

If integrated waveguides, not illustrated, are desired, the patterning of the hard mask layer 1080 and subsequent processing also includes the integrated waveguides. Alternatively, a tapered microfiber can be used for injecting light into the ring.

Bulk Silicon Nitride on Silicon Process with Pedestals.

Figure 11A:
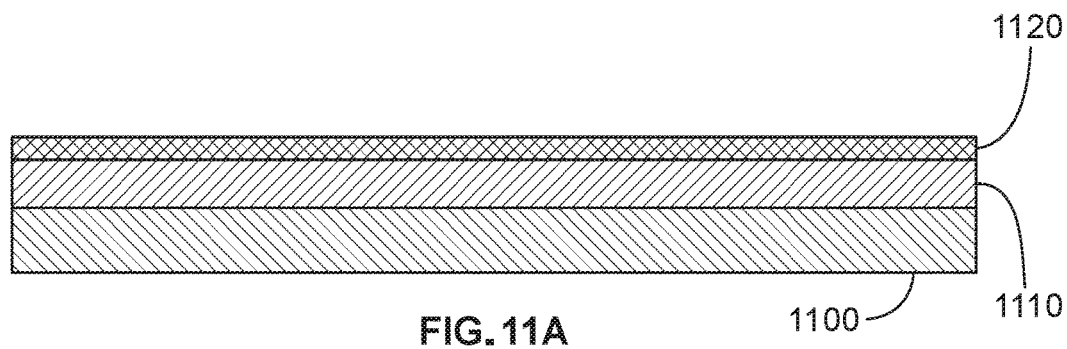
FIGS. 11A-11E illustrate an alternative process in which bulk SiN optics are formed on a silicon substrate wafer in accordance with at least one embodiment of the invention.

FIGS. 11A-11E illustrate an example process in which bulk SiN optics are formed on a silicon substrate wafer 1100. As shown in FIG. 11A, a thermal silicon dioxide layer 1110 having a thickness of 3-μm is grown on the silicon substrate 1100 by LPCVD wet oxidation. A stoichiometric SiN layer 1120 having a thickness of 275-nm is deposited over the silicon dioxide layer 1110 at a temperature of about 800° C. and annealed at 1200° C. for one hour to drive out hydrogen impurities.

Figure 11B:
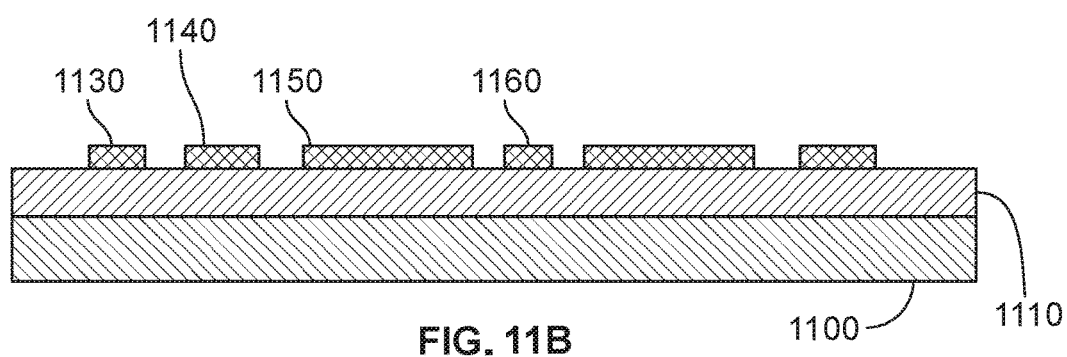

The nitride layer 1120 is patterned and etched, exemplarily in an RIE or ICP tool, to define the waveguide features 1130, the ring features 1140, the anchor features 1150, and the spoke features 1160. These features are shown in FIG. 11B. The photoresist used in the patterning of the nitride layer 1120 to form the waveguide features 1130, the ring features 1140, the anchor features 1150, and the spoke features 1160 is then stripped.

Figure 11C:
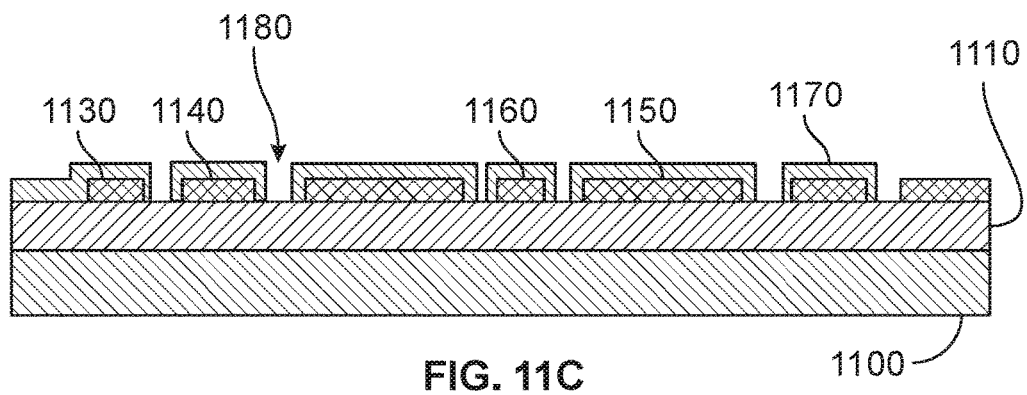

As shown in FIG. 11C, a polysilicon hard mask 1170 having a thickness of 200-nm is deposited by CVD at about 580° C. and annealed at 1200° C. for one hour. The hard mask 1170 is patterned and etched by RIE, stopping at the surface of the silicon dioxide layer 1110. The patterning and etching of the hard mask 1170 leaves openings 1180 through which portions of the silicon dioxide layer 1110 can be removed in the subsequent release step. The photoresist used in the patterning of the hard mask 1170 to form the openings 1180 is then stripped.

Figure 11D:
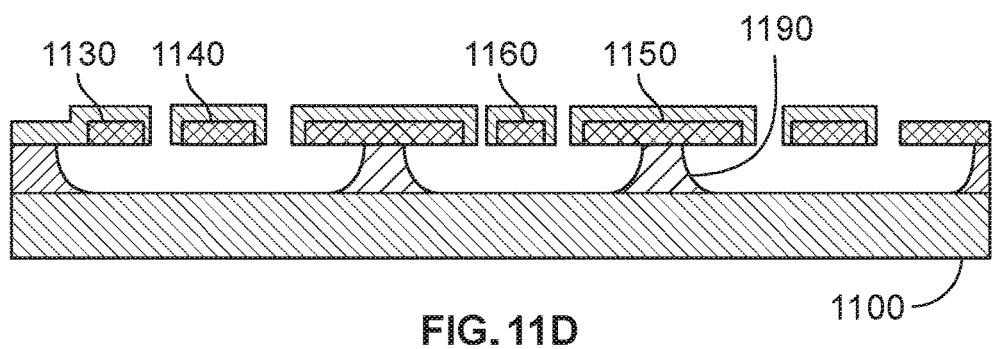

As shown in FIG. 11D, the bulk silicon nitride waveguide features 1130, the ring features 1140, the anchor features 1150, and the spoke features 1160 are released by a buffered oxide etch (BOE). The BOE is timed so as to leave pedestals 1190 of silicon dioxide as supports for the anchor features 1150.

Figure 11E:
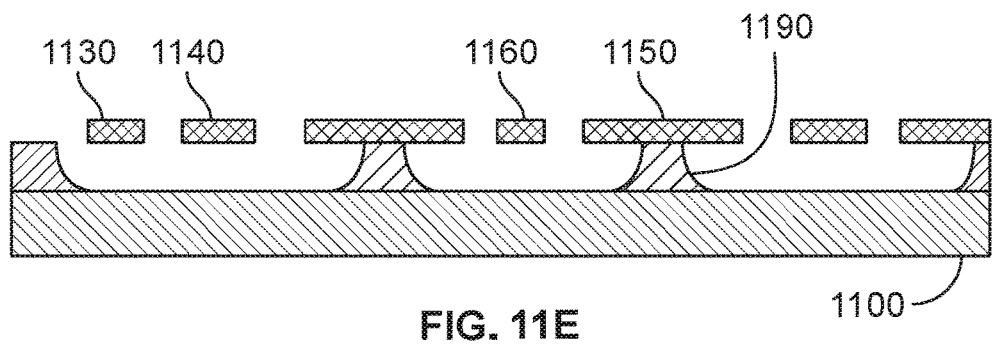

As shown in FIG. 11E, the polysilicon hard mask 1170 is stripped away. The facets for the waveguides, not illustrated are then defined by lithographic patterning and deep reactive ion etching (DRIE).

If integrated waveguides are desired, the patterning of the polysilicon hard mask 1170 and subsequent processing also includes the integrate waveguides. Alternatively, a tapered microfiber can be used for injecting light into the ring features 1140.

Sagnac OM Gyroscopic Systems

Although the above discussion has provided details of the design and fabrication of an individual Sagnac OM gyroscope in accordance with various embodiments, it will be understood that a practical system for navigation will typically require three Sagnac OM gyroscopes, with each occupying a respective orthogonal plane. The design, fabrication, optical stimulation, and readout of each Sagnac OM gyroscope can be as described herein.

In the simplest method of readout, the laser that drives the circulating optical resonator is maintained at a fixed wavelength during operation. However, those skilled in the art will recognize that other readout techniques are available and may be preferred for particular applications. For example, in some applications the laser can be retuned to maintain peak optical resonance during operation. Such an approach can be more robust, but it would generally add to system cost and to power consumption. In another example approach, the laser wavelength is repeatedly swept through resonance while observing the mechanical angular frequency difference as a function of time.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for detecting rotation, comprising:
a light source adapted to generate an input light;
a suspended circulating optical resonator;
a waveguide adapted to receive the input light, the waveguide evanescently coupled to the suspended circulating optical resonator and adapted to provide an input path for a first portion of the input light to the suspended circulating optical resonator and an output path for output light from the suspended circulating optical resonator, the first portion of the input light having a power level greater than a threshold for exciting optomechanical oscillation of the suspended circulating optical resonator at an instantaneous mechanical angular frequency;
a first photodetector optically coupled to the waveguide, the photodetector adapted to receive at least a portion of the output light, the first photodetector adapted to generate a first output detector signal in response to the thus received portion of the output light, the first output detector signal comprising the instantaneous mechanical angular frequency due to optomechanical oscillation of the suspended circulating optical resonator;
a second photodetector optically coupled to the light source, the second photodetector adapted to receive at least a second portion of the input light that is unaffected by rotation of the apparatus, the second photodetector adapted to generate a second output detector signal in response to the thus received second portion of the input light, the second output detector signal comprising the irrotational mechanical angular frequency; and
a signal-processing circuit electrically coupled to the first photodetector and the second photodetector, the signal-processing circuit adapted to mix the first output detector signal with the second output detector signal so as to generate a signal indicative of a difference in frequency between the instantaneous mechanical angular frequency and an irrotational mechanical angular frequency.

2. The apparatus of claim 1, further comprising at least one of:
a bandpass filter electrically coupled to the photodetector, the bandpass filter adapted to isolate the instantaneous mechanical modulation frequency in the output detector signal; and
an amplifier electrically coupled to the photodetector, the amplifier adapted to amplify the output detector signal with a gain G.

3. The apparatus of claim 1, further comprising:
an analog-to-digital converter electrically coupled to the first photodetector, the analog-to-digital converter adapted to convert the first output detector signal to a digital first output detector signal;
wherein the signal-processing circuit comprises a digital signal-processing circuit.

4. The apparatus of claim 1,
wherein the suspended circulating optical resonator has a radius R; and
wherein 10 µm<R<60 µm.

5. The apparatus of claim 1, wherein the suspended circulating optical resonator comprises one of a disk, a ring, and a closed curvilinear loop.

6. The apparatus of claim 1, wherein the signal-processing circuit is adapted to generate a signal indicative of a difference in frequency between a harmonic of the instantaneous mechanical angular frequency and a corresponding harmonic of the irrotational mechanical angular frequency.

7. An apparatus for detecting rotation, comprising:
a light source adapted to generate an input light;
an optical splitter, the optical splitter adapted to split the input light into at least a first portion of the input light and a second portion of the input light;
a first suspended circulating optical resonator;
a second suspended circulating optical resonator;
a first waveguide adapted to receive the first portion of the input light, the first waveguide evanescently coupled to the first suspended circulating optical resonator and adapted to provide a first input path for the first portion of the input light to the first suspended circulating optical resonator and a first output path for first output light from the first suspended circulating optical resonator, the first portion of the input light circulating in the first suspended circulating optical resonator in a first direction, the first portion of the input light having a power level greater than a threshold for exciting optomechanical oscillation of the first suspended circulating optical resonator at a first instantaneous mechanical angular frequency;
a second waveguide adapted to receive the second portion of the input light, the second waveguide evanescently coupled to the second suspended circulating optical resonator and adapted to provide a second input path for the second portion of the input light to the second suspended circulating optical resonator and a second output path for second output light from the second suspended circulating optical resonator, the second portion of the input light circulating in the second suspended circulating optical resonator in a second direction opposite the first direction, the second portion of the input light having a power level greater than a threshold for exciting optomechanical oscillation of the second suspended circulating optical resonator at a second instantaneous mechanical angular frequency;
a first photodetector optically coupled to the first waveguide, the first photodetector adapted to receive at least a portion of the first output light, the first photodetector adapted to generate a first output detector signal in response to the thus received portion of the first output light, the first output detector signal comprising the first instantaneous mechanical angular frequency due to optomechanical oscillation of the first suspended circulating optical resonator; and
a second photodetector optically coupled to the second waveguide, the second photodetector adapted to receive at least a portion of the second output light, the second photodetector adapted to generate a second output detector signal in response to the thus received portion of the second output light, the second output detector signal comprising the second instantaneous mechanical angular frequency due to optomechanical oscillation of the second suspended circulating optical resonator; and
a signal-processing circuit electrically coupled to the first photodetector and the second photodetector, the signal-processing circuit adapted to generate a signal indicative of a difference in frequency between the first instantaneous mechanical angular frequency and the second instantaneous mechanical angular frequency.

8. The apparatus of claim 7, further comprising:
a first bandpass filter electrically coupled to the first photodetector, the first bandpass filter adapted to isolate the first instantaneous mechanical modulation frequency in the first output detector signal; and
a second bandpass filter electrically coupled to the second photodetector, the second bandpass filter adapted to isolate the second instantaneous mechanical modulation frequency in the second output detector signal.

9. The apparatus of claim 8, further comprising:
a first amplifier electrically coupled to the first bandpass filter, the first amplifier adapted to amplify the thus filtered first output detector signal with a gain G; and
a second amplifier electrically coupled to the second bandpass filter, the second amplifier adapted to amplify the thus filtered second output detector signal with the gain G.

10. The apparatus of claim 8, wherein the signal-processing circuit is adapted to mix the thus filtered first output detector signal with the thus filtered second output detector signal so as to produce the signal indicative of the difference in frequency between the first instantaneous mechanical angular frequency and the second instantaneous mechanical angular frequency.

11. The apparatus of claim 7, further comprising:
a first amplifier electrically coupled to the first photodetector, the first amplifier adapted to amplify the first output detector signal with a gain G; and
a second amplifier electrically coupled to the second photodetector, the second amplifier adapted to amplify the second output detector signal with the gain G.

12. The apparatus of claim 7, further comprising:
a first analog-to-digital converter electrically coupled to the first photodetector, the first analog-to-digital converter adapted to convert the first output detector signal to a digital first output detector signal; and
a second analog-to-digital converter electrically coupled to the second photodetector, the second analog-to-digital converter adapted to convert the second output detector signal to a digital second output detector signal;
wherein the signal-processing circuit comprises a digital signal-processing circuit.

13. The apparatus of claim 7, wherein the signal-processing circuit is adapted to mix the first output detector signal with the second output detector signal so as to produce the signal indicative of the difference in frequency between the first instantaneous mechanical angular frequency and the second mechanical angular frequency.

14. The apparatus of claim 7, wherein each of the first suspended circulating optical resonator and the second suspended circulating optical resonator comprises one of a disk, a ring, and a closed curvilinear loop.

15. The apparatus of claim 7, wherein each of the first suspended circulating optical resonator and the second suspended circulating optical resonator comprises one of phosphosilicate glass (PSG) and bulk silicon nitride (SiN).

16. The apparatus of claim 7,
wherein the first suspended circulating optical resonator and the second suspended circulating optical resonator have the same radius R; and
wherein 10 μm<R<60 μm.

17. The apparatus of claim 7, wherein the signal-processing circuit is adapted to generate a signal indicative of a difference in frequency between a harmonic of the first instantaneous mechanical angular frequency and a corresponding harmonic of the second instantaneous mechanical angular frequency.

18. A method for detecting rotation, comprising the steps of:
- injecting first input light into a suspended circulating optical resonator so as to excite an optomechanical oscillation of the suspended circulating optical resonator, the injected input light having a power level greater than a threshold for exciting optomechanical oscillation of the suspended circulating optical resonator at an instantaneous mechanical angular frequency;
- withdrawing output light from the suspended circulating optical resonator, the output light comprising the instantaneous mechanical angular frequency due to optomechanical oscillation of the suspended circulating optical resonator;
- receiving a second input light that is unaffected by rotation, the second input light comprising an irrotational mechanical angular frequency; and
- generating a signal indicative of a difference in frequency between the instantaneous mechanical angular frequency and the irrotational mechanical angular frequency.

19. The method of claim 18, wherein the suspended circulating optical resonator comprises one of a disk, a ring, and a closed curvilinear loop.

20. The method of claim 18, wherein the step of generating a signal further comprises generating a signal indicative of a difference in frequency between a harmonic of the instantaneous mechanical angular frequency and a corresponding harmonic of the irrotational mechanical angular frequency.

* * * * *